Figure 1:
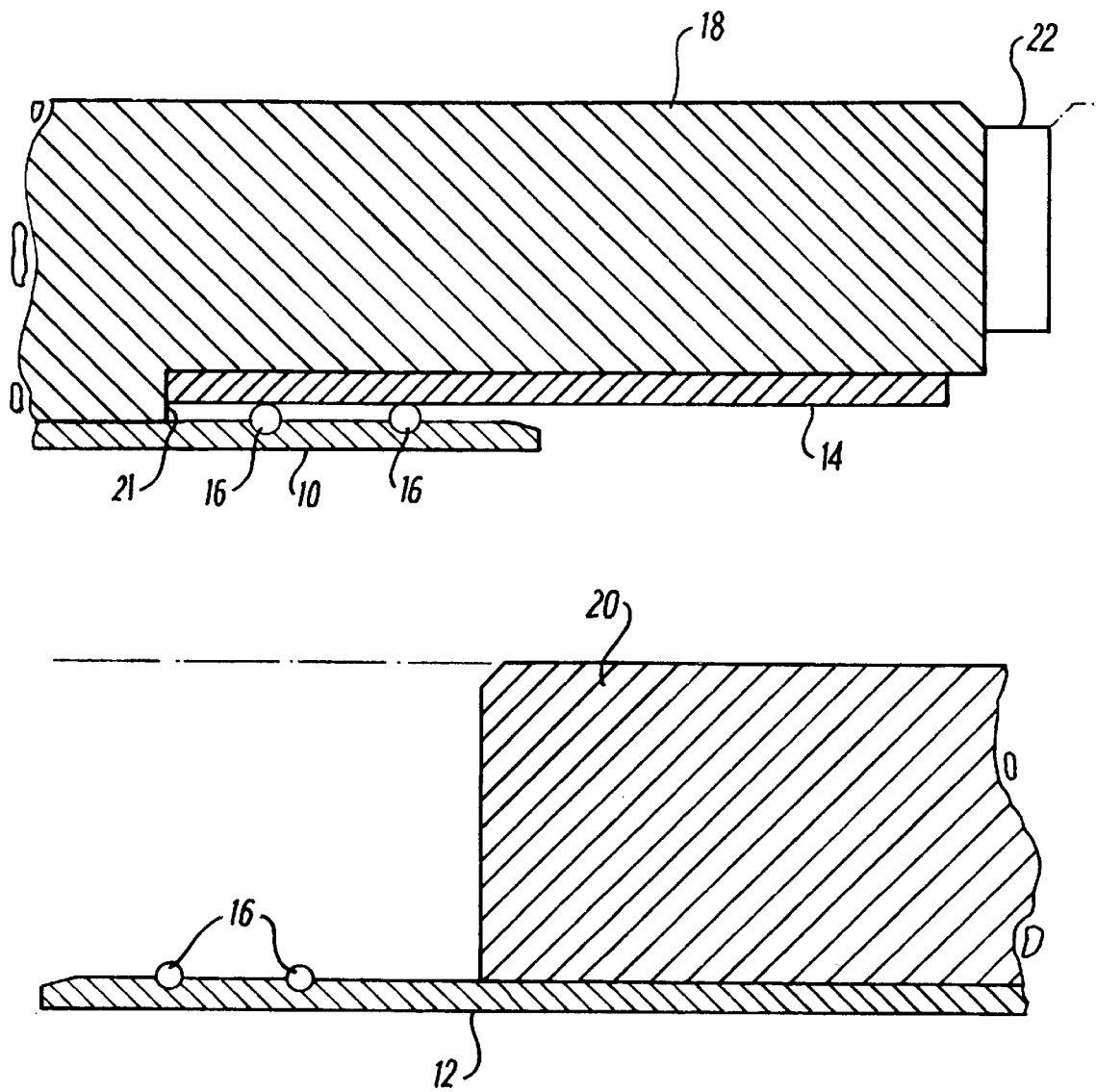

United States Patent

Boatman

[11] Patent Number: 5,971,440
[45] Date of Patent: Oct. 26, 1999

[54] PIPE ASSEMBLY

[76] Inventor: Peter James Boatman, c/o Kuwait Sponge Industries Co. W.L.L., P.O. Box 5090, Safat, Code 13051, Kuwait

[21] Appl. No.: 08/849,485
[22] PCT Filed: Dec. 1, 1995
[86] PCT No.: PCT/GB95/02809
    § 371 Date: Aug. 8, 1997
    § 102(e) Date: Aug. 8, 1997
[87] PCT Pub. No.: WO96/18064
    PCT Pub. Date: Jun. 13, 1996

[30] Foreign Application Priority Data

Dec. 5, 1994 [GB] United Kingdom ............... 9424501

[51] Int. Cl.⁶ ..................................................... F16L 9/14
[52] U.S. Cl. .......................... 285/55; 285/369; 285/351; 285/230
[58] Field of Search .................. 285/55, 230, 251, 285/369; 138/172

[56] References Cited

U.S. PATENT DOCUMENTS

| 3,415,544 | 12/1968 | Hucks, Jr. ................... | 285/230 |
| 3,767,232 | 10/1973 | Smith ........................ | 285/230 |
| 3,953,629 | 4/1976 | Wesch . | |
| 4,167,953 | 9/1979 | Carlström . | |
| 4,449,852 | 5/1984 | Muszynski ................ | 138/172 |
| 4,450,873 | 5/1984 | Sadler et al. . | |
| 4,909,519 | 3/1990 | Anderson ................. | 285/230 |
| 5,054,824 | 10/1991 | Wyss . | |
| 5,405,171 | 4/1995 | Allen et al. ................ | 285/55 |

FOREIGN PATENT DOCUMENTS

| 55612 | 9/1932 | Australia ............... | 285/230 |
| 35774 | 5/1973 | Australia ............... | 285/230 |
| 0 017 254 B2 | 10/1980 | European Pat. Off. . | |
| 2 421 324 | 10/1979 | France . | |
| 3026681 | 2/1982 | Germany ............... | 285/230 |

OTHER PUBLICATIONS

Article: Microtunneling, Sewres and Manholes with Polymer Concrete; www.microtunneling .com; 7 pages.

Primary Examiner—Erick K. Nicholson
Attorney, Agent, or Firm—Adams Law Firm, P.A.

[57] ABSTRACT

A pipe is assembled from sections of a liner pipe formed of a moulded glass reinforced plastics material (GRP). A sleeve, also of moulded GRP, sealingly surrounds the joint between the sections. An outer pipe of polymer concrete is formed in sections on the liner pipe sections to surround the latter together with the sleeve. The sections have a packer provided between adjacent ends, and the joint is offset from the joint between the liner pipe sections. The GRP of the liner pipe can withstand high chemical concentrations in toxic sewage, the sleeve preventing seepage of sewage and being able to withstand chemical attach by any passing through the inner joint. The polymer concrete enables the pipe to withstand jacking forces, and is also resistant to chemical attack from a basically saline surrounding soil.

16 Claims, 2 Drawing Sheets

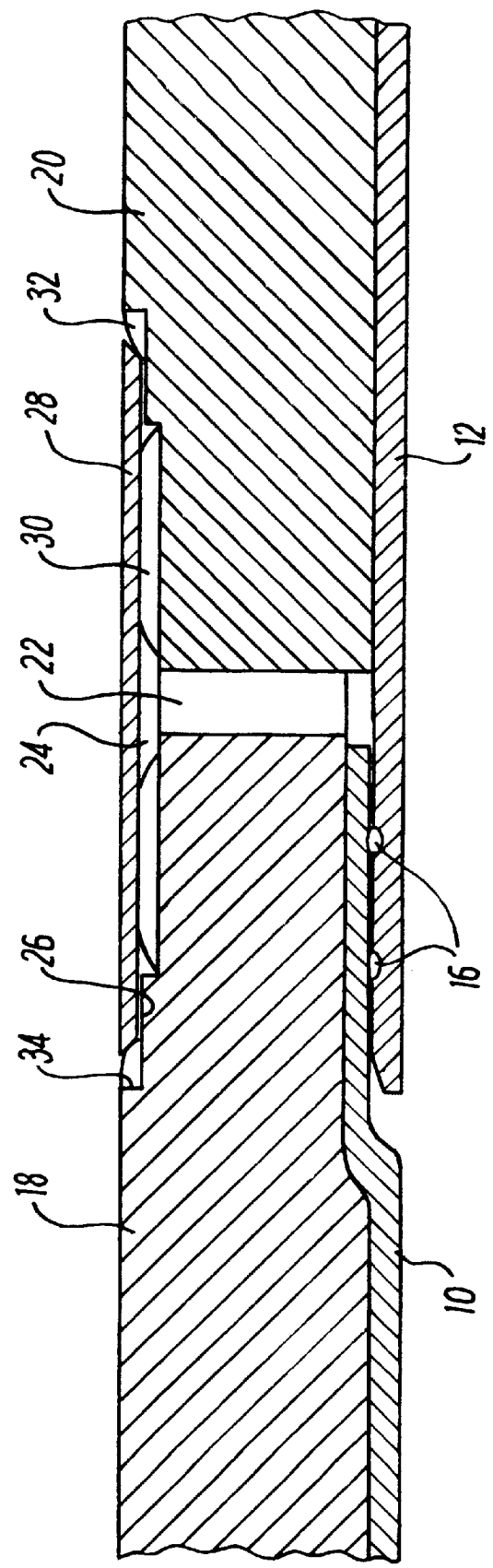

PIPE ASSEMBLY

This application is a national stage application, according to Chapter II of the Patent Cooperation Treaty. This application claims the priority date of Dec. 5, 1994, for UK Patent Application No. 9424501.6.

This invention relates to a pipe assembly, and particularly a corrosion resistant pipe assembly adapted for use with liquids having high chemical concentrations or of a corrosive nature and in ground having a corrosive nature.

Pipes are either laid in the ground by cutting an open trench, or are laid at increased depths by micro-tunnelling where the pipes are jacked through the ground. The pipes in the latter case have to be strong enough to withstand the forces imposed by jacking, and in each case have also to be strong enough to withstand the inherent ground forces. In conditions where the pipe contents have a high chemical concentration or are of a corrosive nature, the pipes cannot be made of conventional materials, which are incapable of withstanding chemical attack by the contents such as raw sewage, and sea water.

Pipes which are corrosion resistant, such as glass reinforced plastics or rigid PVC pipes, are classed as flexible pipes and rely on the surrounding ground to provide their strength. As a result, after laying the pipes, back filling has to be carried out fairly carefully using special graded materials. In areas with a high water table, or if construction takes place at a later date near the pipes, the ground surrounding the pipes can be disturbed, so removing the support for the pipes.

To overcome this, thicker pipes could be used, but this becomes expensive. Alternatively, glass reinforced plastics pipes incorporating sand with a glass fibre reinforcement have been used, but these are not very corrosion resistant, and the sand incorporated causes the laminate to break down so that they are not suitable for use at pressure.

Also in some countries, the nature of the ground is such that the pipes have to withstand possible attack from corrosive elements in the surrounding soil and are subject to high relative movements between adjacent pipe sections. Often they can be subject to not being laid in accordance with manufacturer's recommendations.

According to the present invention there is provided a pipe having an inner section preformed of a corrosion resistant plastics material, and an outer section which is required to enable the pipe to withstand external forces applied thereto during installation or from the surrounding ground after installation and to increase the rigidity of the inner section, the outer section being formed of polymer concrete which is moulded to a desired configuration around the inner section, the moulding enabling the concrete to provide the required rigidity, the inner section being adapted to provide means for sealingly surrounding the joint between the pipe and an adjacent pipe laid end to end therewith, the surrounding means being formed of a corrosion resistant material.

Preferably the inner section is moulded from a glass reinforced plastics material, preferably a material formed of a corrosion resistant resin and corrosion resistant glass fibre. Preferably also, the surrounding means is formed as an increased diameter end part on one end of the inner section and a longitudinally extending part on the other end of the inner section, whereby, in use, the one end part of the pipe can overlie the other end part of the adjacent pipe. Alternatively, the surrounding means comprises a sleeve located between the inner and outer sections to sealingly overlie a free end of the inner section. The sleeve is preferably also moulded from a glass reinforced plastics material, for example a material formed of a corrosion resistant resin with corrosion resistant glass fibre.

Preferably also the polymer concrete is formed from synthetic resin and inorganic fillers. The polymer concrete may be formed with an abrasion resistant outer face, for example of glass reinforced plastics material such as a synthetic resin with glass fibre.

According to the present invention there is further provided a pipe assembly comprising a plurality of pipes for end to end arrangement, each pipe having an inner pipe section preformed of a corrosion resistant plastics material, and an outer pipe section surrounding the inner pipe section, the outer pipe sections being required to enable the pipe to withstand external forces applied thereto during installation or from the surrounding ground after installation and to increase the rigidity of the inner sections, each outer section being formed of polymer concrete which is moulded to a desired configuration around the inner section, the moulding enabling the concrete to provide the required rigidity and at least one sleeve for sealingly surrounding the joint between adjacent pipes, the sleeve being formed of a corrosion resistant material.

Preferably each of the inner pipe sections is moulded from a glass reinforced plastics material, preferably a material formed of a corrosion resistant resin and corrosion resistant glass fibre. The or each sleeve is preferably also moulded from a glass reinforced plastics material, for example a material formed of a corrosion resistant resin with corrosion resistant glass fibre.

Preferably also the outer pipe sections are each formed of polymer concrete, for example formed from synthetic resin and inorganic fillers. The polymer concrete may be formed with an abrasion resistant outer face, for example of glass reinforced plastics material such as a synthetic resin with glass fibre.

Each of the inner sections may have an increased diameter end part on one end thereof and a longitudinally extending part on the other end thereof, the one end part of one pipe being arranged to overlie the other end part of the adjacent pipe. Said one sleeve may be provided for sealingly surrounding the joint between the or each pair of outer pipe sections, and a further sleeve may be located between the inner and outer sections for sealingly surrounding the joint between the or each pair of inner pipe sections, the further sleeve being formed of a corrosion resistant material.

The or each sleeve may be arranged to overlie each side of the joint, and at least one seal may be provided between the sleeve and each side of the joint. Each seal may be chemically resistant, and may be formed of rubber, for example a hydrofluoric rubber or an EPDM rubber.

At each joint of the outer pipe sections, a packer may be provided for locating between the adjacent ends of the respective pipe sections, and the packer may be formed of wood. Said one sleeve may be provided for sealingly surrounding the joint between the or each pair of outer pipe sections. The or each outer sleeve is preferably formed of a glass reinforced plastics material, for example formed from corrosion resistant resin with corrosion resistant glass fibre, and may locate in respective recesses in the outer faces of the outer pipe sections.

Each of the inner pipe sections may be provided at its inner surface with a homogeneous lining formed from a chemically resistant resin together with glass fibre.

The present invention yet further provides a method of assembling a pipe comprising preforming a plurality of inner pipe sections each of a corrosion resistant plastics material, forming a plurality of outer pipe sections, which are required to enable the pipe to withstand external forces applied thereto during installation or from the surrounding ground after installation and to increase the rigidity of the inner sections, by moulding polymer concrete to a desired configuration around the inner pipe sections, whereby to provide the required rigidity, and sealingly surrounding the joint with at least one sleeve which is formed of a corrosion resistant material.

Embodiments of the present invention will now be described by way of example only, with reference to the the accompanying drawings, in which:

FIG. 1 is a sectional view through part of one embodiment of a sewage pipe assembly prior to adjacent pipe sections being interconnected; and FIG. 2 is a sectional view through part of another embodiment of a sewage pipe assembly with adjacent pipe sections interconnected.

Referring to FIG. 1 of the drawings, there is shown a joint area between an intended end to end connection between a pair of sewage pipe sections, prior to the sections being joined together. An inner or liner pipe has two sections 10, 12 intended to be in end to end alignment, each section 10, 12 being formed of a corrosion resistant material sufficient to withstand the high chemical concentrations to be found in sewage in certain conditions. The sections 10, 12 are preferably each formed of a moulded glass reinforced plastics (GRP) material, for example a corrosion resistant resin such as a vinylester resin with corrosion resistant glass fibre. Also, each section 10, 12 may be formed homogeneously with an inner liner or facing formed from a chemically higher resistant resin and glass fibre. The sections 10, 12 can be formed as filament wound pipes with a minimum thickness of 6 mm.

A sleeve 14 surrounds the joint between the sections 10, 12 and overlies the ends of the latter, the sleeve 14 preferably being formed of a corrosion resistant material for example a moulded GRP material. Again, the latter material may be formed from a corrosion resistant resin such as a vinylester resin with corrosion resistant glass fibre. The sleeve 14 sealingly surrounds the joint between the pipe sections 10, 12 by means of a pair of rubber sealing rings 16 between the sleeve 14 and each of the sections 10, 12. The seals 16 are preferably formed of a chemically resistant rubber, and may be of a hydrofluoric rubber or EPDM.

When the pipe assembly has to be strong enough to withstand forces imposed by jacking through the ground during the process of micro-tunnelling, conventional materials such as concrete are undesirable in that, for strength, the concrete has to be very thick so that the resultant pipe is very heavy, and also, due to the corrosive nature of the soil in some countries, the concrete is susceptible to chemical attack. To have sufficient strength, a pipe formed of GRP would also have to be very thick and consequently would be very expensive. A GRP pipe formed by the sections 10, 12 is given sufficient strength by the provision of an outer pipe formed of a strength giving material such as polymer concrete, the outer pipe being illustrated in the drawing as having two pipe sections 18, 20 arranged to locate in end to end alignment, with the joint therebetween being oft-set from the joint between the inner pipe sections 10, 12. For this purpose, the outer pipe section 18 has an annular recess 21 on its inner face in which to locate the sleeve 14.

The polymer concrete sections 18, 20 are moulded around the respective GRP pipe sections 10, 12. During moulding, shuttering for the polymer concrete is coated with a synthetic resin glass fibre reinforcement which provides extra strength and an abrasion or scratch resistant outer face to the outer pipe sections 18, 20. A packer 22, preferably of wood, is provided between adjacent ends of the pipe sections 18, 20.

The outer faces of the pipe sections 18, 20 may be recessed adjacent the joint area whereby an outer sleeve (not shown) can sealingly locate therein, such an outer sleeve preferably being formed of a GRP material, for example of a corrosion resistant resin such as a vinylester resin with corrosion resistant glass fibre.

With such an assembled pipe, the GRP of the inner pipe can withstand high chemical concentrations with toxic liquids passing therethrough, the sleeve 14 preventing seepage of liquid and being able to withstand chemical attack by any liquids passing through the joint in the pipe sections 10, 12. The increased strength of polymer concrete enables the assembled pipe to withstand jacking forces without a large and heavy assembled pipe as would otherwise be required. The polymer concrete is also resistant to chemical attack from the basically saline surrounding soil, when used for example in Middle East countries. The use of the external sleeve further prevents the ingress of ground water into the assembled pipe, and in addition affords much greater shear strength.

In FIG. 2 of the drawings, like reference numbers are used for like parts with the first embodiment shown in FIG. 1. In the FIG. 2 embodiment, the sleeve 14 is omitted, and one pair of the rubber sealing rings 16 seals the joint directly between the sections 10, 12.

The outer faces of the pipe sections 18, 20 are recessed adjacent the joint area, each recess being stepped in a direction away from the joint to provide a First recessed section 24 at the joint, and a second, pore shallow, recessed section 26. An outer sleeve 28 locates across the joint in the recesses, with a first sealing ring 30 being located in each recessed section 24 between the sleeve 28 and the respective pipe section 18, 20, and a second sealing ring 32 being located in each of the recessed sections 26 to locate between a respective end of the sleeve 28 and an end shoulder 34. The sleeve 28 is preferably formed of a GRP material, for example of a corrosion resistant resin such as a vinylester resin with corrosion resistant glass fibre.

The pipe of FIG. 2 may omit the sleeve 28 and associated recesses in the outer face, to be used as a standard jacking pipe, or may be profiled at the respective ends of the pipe sections 18, 20 and omit the packer 22, for use as a standard pipe.

When a pipe is required for laying in an open cut trench, i.e. where jacking forces are not involved, it is appropriate to have a pipe of increased stiffness, particularly in some countries where the nature of the ground is such that increased relative movement between pipe sections can be anticipated. The inner GRP pipe takes into account the high chemical concentrations of the contents, but the inherent flexibility of GRP would otherwise allow movement of the pipe due to the surrounding ground conditions, and this in turn might lead to sealing problems. Use of the outer pipe, preferably of polymer concrete, enables a sufficient increase in stiffness to prevent undesirable relative movement between pipe sections, without large increases in pipe sizes. The pipe of FIG. 2 may also be appropriate for laying in an open cut trench.

The use of polymer concrete together with GRP components can result in a 50% increase in strength of the assembled pipe in relation to a polymer concrete pipe. The resultant pipe is as rigid as a concrete pipe but does not require to have steel reinforcement. A polymer concrete pipe without GRP elements can only work at low pressures, but with GRP elements, the assembled pipe can work at high pressures, for example 2500 psi, and can also withstand vacuum.

Various modifications may be made without departing from the invention, which is applicable to gravity pipes or pressure pipes. For example, different designs of seals may be used and different pipe materials may be used provided they meet the necessary requirements.

I claim:

1. A pipe assembly comprising a plurality of pipes arranged end to end, each of said pipes comprising:
   (a) an inner pipe section preformed of a corrosion resistant plastics material;
   (b) an outer pipe section surrounding said inner pipe section, and formed of a polymer concrete molded around said inner pipe section for providing sufficient rigidity to enable said pipe to withstand external forces applied thereto during installation or from the surrounding ground after installation;
   (c) at least one sleeve for sealingly surrounding a joint between adjacent ones of said plurality of pipes, and arranged to overlie respective portions of the adjacent pipes on each side of the joint, said sleeve being formed of a corrosion resistant material; and
   (d) at least one seal provided between the sleeve and each of the adjacent pipes on each side of the joint.

2. A pipe assembly according to claim 1, wherein each of the inner pipe sections of said plurality of pipes is molded from a glass reinforced plastics material.

3. A pipe assembly according to claim 2, wherein the glass reinforced plastics material is formed of a corrosion resistant resin and corrosion resistant glass fiber.

4. A pipe assembly according to claim 1, wherein said at least one sleeve is molded from a glass reinforced plastics material.

5. A pipe assembly according to claim 4, wherein the sleeve material is formed of a corrosion resistant resin with corrosion resistant glass fiber.

6. A pipe assembly according to claim 1, wherein the polymer concrete is formed with an abrasion resistant outer face.

7. A pipe assembly according to claim 6, wherein the outer face is formed of a glass reinforced plastics material.

8. A pipe assembly according to claim 7, wherein the outer face is provided by a synthetic resin with glass fiber.

9. A pipe assembly according to claim 1, wherein each of the inner sections of said plurality of pipes has an increased diameter end part on one end thereof and a longitudinally extending part on the other end thereof, the one end part of one pipe being arranged to overlie the other end part of the adjacent pipe.

10. A pipe assembly according to claim 1, wherein a further sleeve is located between the inner and outer sections for sealingly surrounding the joint between the inner pipe sections of adjacent pipes, the further sleeve being formed of a corrosion resistant material.

11. A pipe assembly according to claim 1, wherein said at least one seal is chemically resistant.

12. A pipe assembly according to claim 1, wherein said at least one seal is formed of hydrofluoric rubber.

13. A pipe assembly according to claim 1, wherein said at least one seal is formed of an EPDM rubber.

14. A pipe assembly according to claim 1, wherein, at each joint of the outer pipe sections of respective pipes, a packer is provided for locating between the adjacent ends of the respective pipe sections.

15. A pipe assembly according to claim 14, wherein the packer is formed of wood.

16. A pipe assembly according to claim 1, wherein each of the inner pipe sections of said plurality of pipes is provided at its inner surface with a homogeneous lining formed from a chemically resistant resin together with glass fiber.

* * * * *